United States Patent [19]

Yoon

[11] Patent Number: 5,724,240
[45] Date of Patent: *Mar. 3, 1998

[54] METHOD FOR AUTOMATICALLY RESETTING A MICROCOMPUTER IN A VIDEO CASSETTE RECORDER

[75] Inventor: Tae-Goon Yoon, Seoul, Rep. of Korea

[73] Assignee: Daewoo Electronics Co., Ltd., Seoul, Rep. of Korea

[*] Notice: The terminal 22 months of this patent has been disclaimed.

[21] Appl. No.: 278,482

[22] Filed: Jul. 20, 1994

[30] Foreign Application Priority Data

Jul. 21, 1993 [KR] Rep. of Korea ............... 93-13823

[51] Int. Cl.⁶ .................................................. G06F 11/00
[52] U.S. Cl. ........................... 364/184; 364/131; 371/9.1; 360/69
[58] Field of Search ................................ 364/131–135, 364/184–187, 136; 371/9.1, 62, 68.3, 12, 16.3; 360/69, 70; 395/575

[56] References Cited

U.S. PATENT DOCUMENTS

| | | | |
|---|---|---|---|
| 4,811,200 | 3/1989 | Wagner et al. | 395/575 |
| 4,881,227 | 11/1989 | Bühren | 371/9.1 |
| 4,882,669 | 11/1989 | Miura et al. | 364/184 |
| 5,182,683 | 1/1993 | Mitsuhashi | 360/70 |

*Primary Examiner*—Roy N. Envall, Jr.
*Assistant Examiner*—Steven R. Garland
*Attorney, Agent, or Firm*—Anderson, Kill & Olick, P.C.

[57] ABSTRACT

In a video cassette recorder incorporating two interconnected microcomputers for its control, an automatic watchdog method sends from a first microcomputer a request command for watchdog data to a second microcomputer periodically. Upon receiving the watchdog data request command, the second microcomputer, if operating normally, is forced to respond to the watchdog data generated in a predetermined manner. Accordingly, when the first microcomputer receives the watchdog data generated not in the predetermined manner, or does not receive the watchdog data at all, it recognizes that the second microcomputer is in an errant state. When the first microcomputer detects such an abnormality in the second microcomputer, it reinitializes the second microcomputer through a reset port thereof.

3 Claims, 5 Drawing Sheets

METHOD FOR AUTOMATICALLY RESETTING A MICROCOMPUTER IN A VIDEO CASSETTE RECORDER

FIELD OF THE INVENTION

The present invention relates to a video cassette recorder; and, more particularly, to a method for automatically resetting one faulty operating microcomputer of two interconnected microcomputers present in a video cassette recorder.

DESCRIPTION OF THE PRIOR ART

Recent developments in the integration technology of electric/electronic circuits has made it possible to employ a microcomputer for controlling various types of equipment ranging from, e.g., a simple weighing machine to a highly sophisticated car.

However, when incorporated in such equipment, a microcomputer is subject to unavoidable noises, such as static electricity, originating from, e.g., external electric/electronic circuits connected thereto, which may cause the microcomputer to malfunction. For example, in a microcomputerized machinery employing a control program, external noises and the like may sometimes cause the program to jump out of the intended control loop. Once the software is gone out of control, the equipment would not perform its intended functions; and the user of the equipment has no choice but to reset the microcomputer by depressing, e.g., a button shown in FIG. 1, in order to reinitialize the microcomputer, requiring a manual intervention.

Consequently, practitioners in the art have developed several automatic watchdog techniques for detecting an errant state of a microcomputer incorporated in an electronic device and then reinitializing the faulty operating microcomputer to a known operating state. For instance, U.S. Pat. No. 4,845,467 issued to Nagaoka discloses a keyboard having an encoder in the form of a microcomputer. The keyboard also includes a key matrix circuit and a watchdog circuit (an automatic reset circuit). The microcomputer constantly feeds a key scanning signal to the key matrix circuit and to the watchdog circuit. If a program used in the microcomputer gets out of control due to, e.g., an external noise, the key scanning signal is no longer generated. When the watchdog circuit detects such cessation of the key scanning signal which extends over a given period of time, the watchdog circuit supplies a reset signal to force the microcomputer to restart from the beginning of its program.

If there is a need for a system to carry out high performance, high speed processing and/or multifunctions as seen in, e.g., a video cassette recorder, a plurality of microcomputers rather than a single microcomputer are required within the system to separately control its functions. When such a plurality of microcomputers are employed to control different functions, the task of detecting and correcting a faulty state of each of such microcomputers may become rather complex and difficult.

SUMMARY OF THE INVENTION

It is, therefore, an object of the present invention to provide a simple method for automatically resetting one faulty operating microcomputer of two interconnected microcomputers incorporated in a video cassette recorder.

It is another object of the present invention to provide a simple method for automatically resetting one errant microcomputer of two interconnected microcomputers incorporated in a video cassette recorder, without requiring a separate watchdog circuitry.

In accordance with the present invention, there is provided in a video cassette recorder incorporating two interconnected microcomputers for the control thereof, a method for, upon detecting an abnormality in a first of the two microcomputers, resetting the first microcomputer, comprising the steps of: (a) sending from a second of the two microcomputers a request command for watchdog data to the first microcomputer; (b) generating in the first microcomputer watchdog data in a predetermined manner; (c) transmitting from the first microcomputer the watchdog data to the second microcomputer in response to the request command for the watchdog data; (d) determining in the second microcomputer whether the watchdog data has been generated in the predetermined manner; (e) resetting the first microcomputer when the watchdog data has not been generated in the predetermined manner as determined in step (d); and (f) repeating said steps (a) to (e) periodically.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
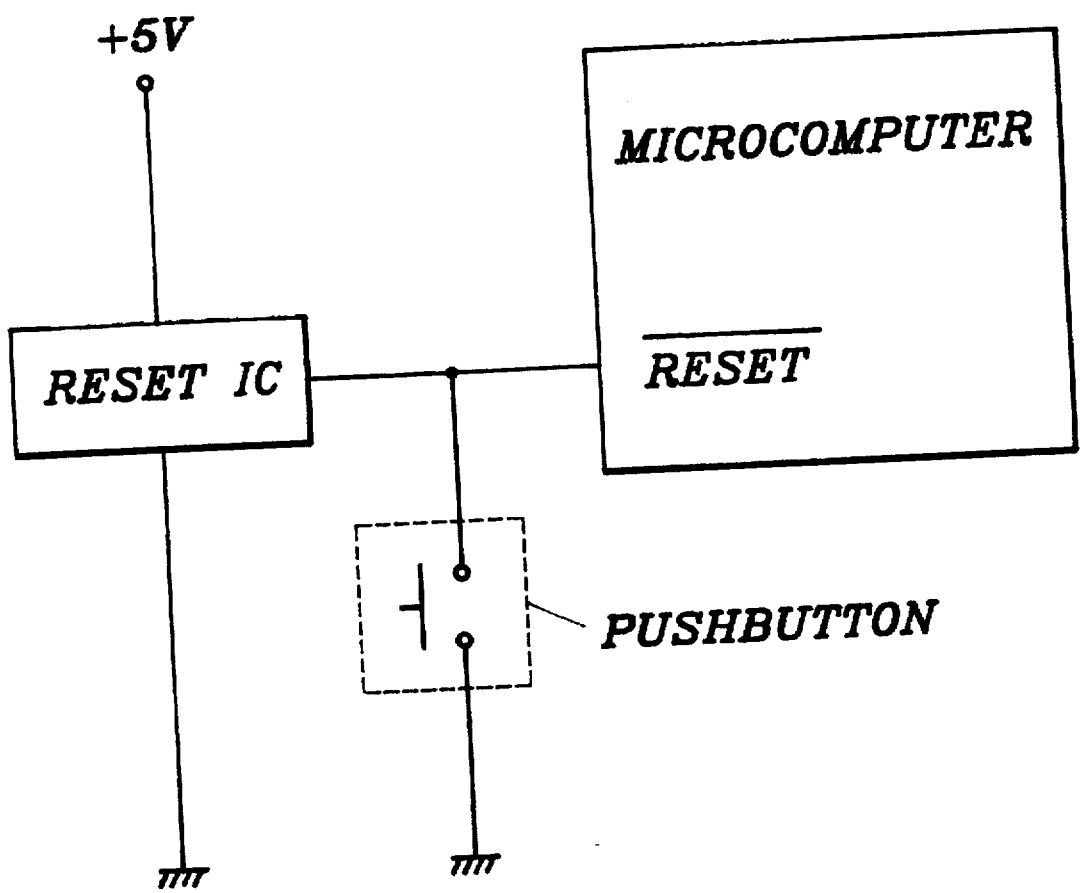
FIG. 1 shows a microcomputer with a manually-operated reset pushbutton.
Figure 2:
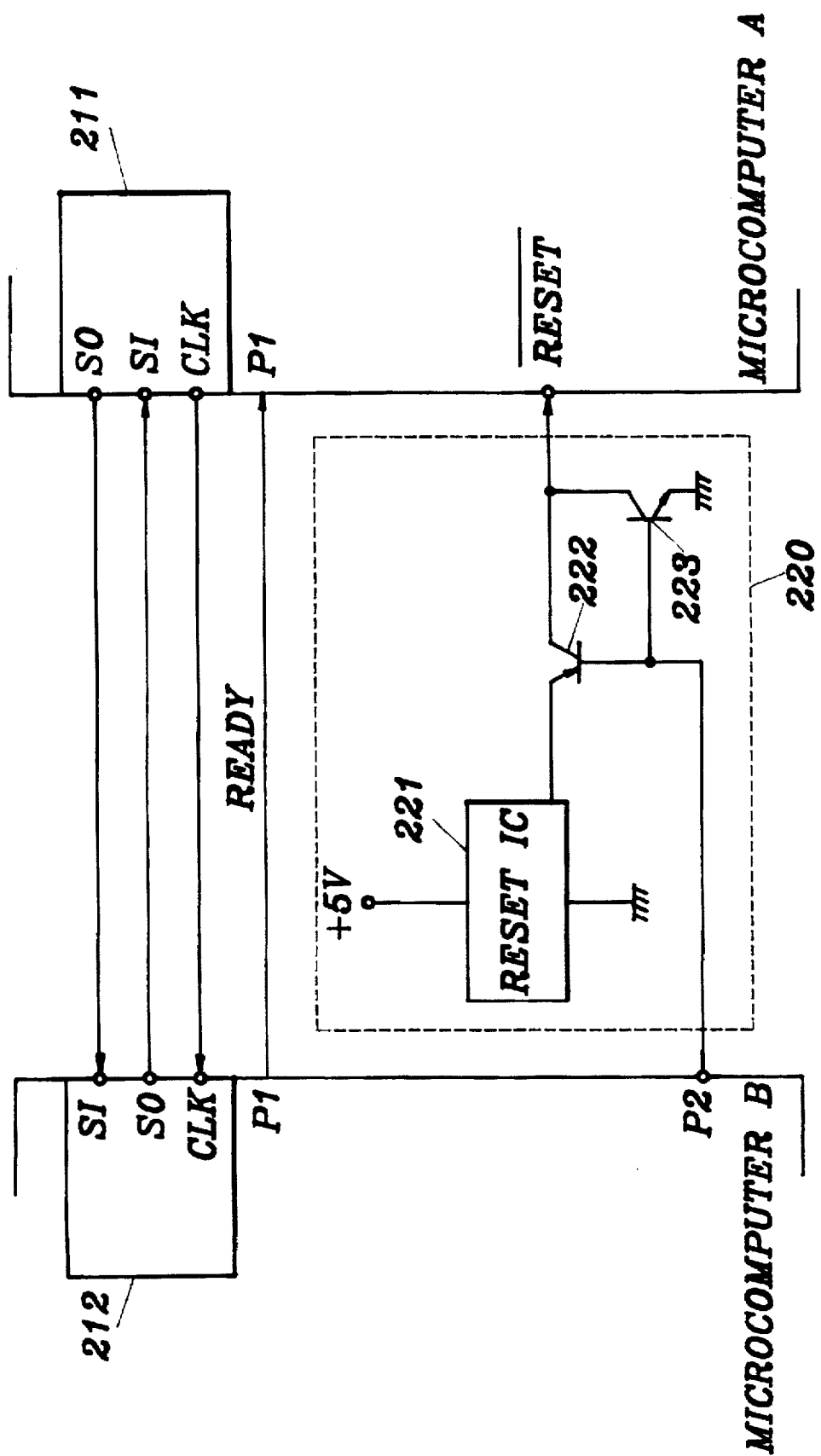
FIG. 2 presents a block diagram of two interconnected microcomputers incorporated in a video cassette recorder for the various control thereof, which may be used to implement the automatic reset method of the present invention.

FIG. 2 is an exemplary block diagram of two interconnected microcomputers A and B incorporated in a video cassette recorder(not shown) for the control thereof, which may be used to implement the automatic reset(watchdog) method of the present invention as will be described hereinafter.

Microcomputer A(often called as a "timer micom" in the relevant industry) may serve to "converse" with the user: that is, to receive user instructions entered by means of keys and the like and to display the current mode of operation (e.g., play, record, fast forward, rewind or stop mode) and other relevant information on a display unit. Microcomputer A may also serve to perform, in response to the user instructions, operation mode switching, channel selection, autotracking, and so on within the video cassette recorder. Meanwhile, microcomputer B(often called as a "servo/syscon micom" in the relevant industry) may sequentially perform respective control steps by producing, e.g., signals for driving a drum motor, for driving a capstan motor, for autotracking circuit, etc. in the video cassette recorder. In this configuration, data transfers, i.e., data exchanges between microcomputers A and B are performed by serial transfer means 211, 212.

Figure 3:
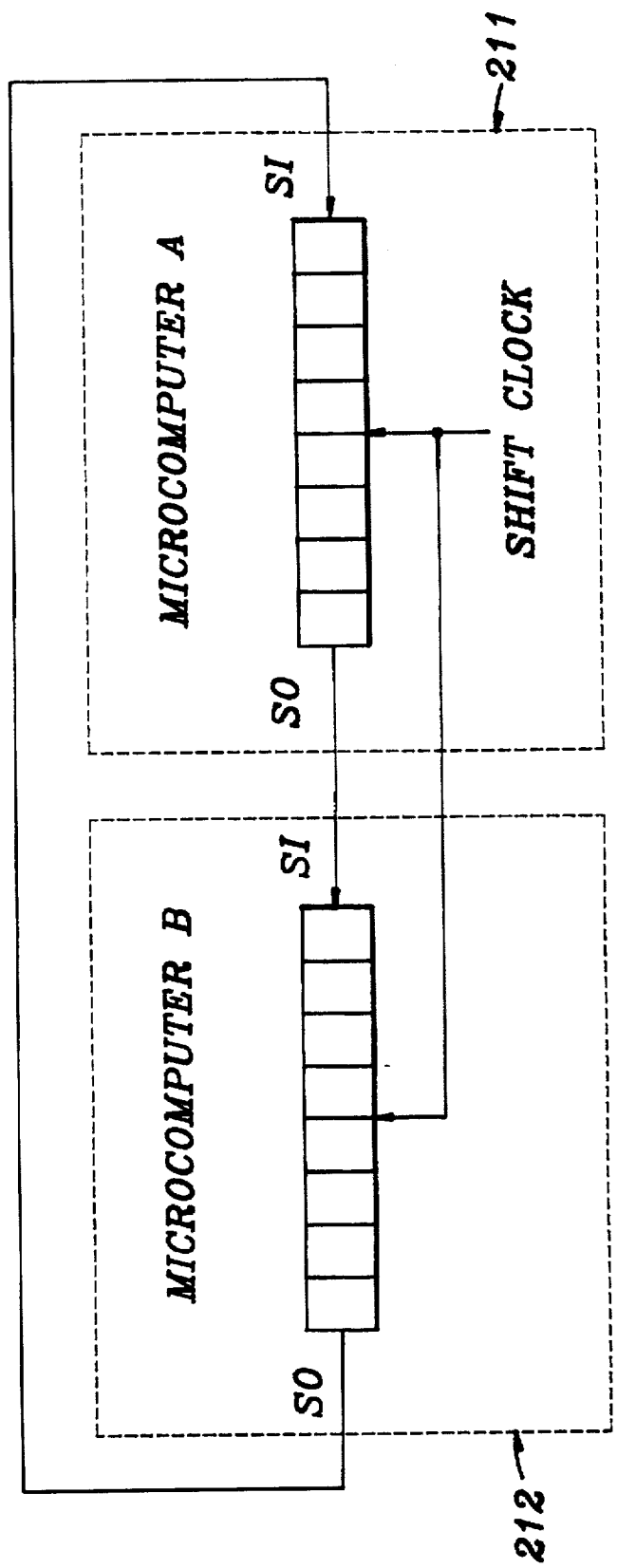
FIG. 3 is a view showing the connection details between serial data transfer means comprising serial shift registers of microcomputers A and B, respectively.

In FIG. 2, a serial data output port SO of microcomputer A is connected to a serial data input port SI of microcomputer B, and a serial data output port SO of microcomputer B is connected to a serial data input port SI of microcomputer A, and a shift clock port CLK of microcomputer A is connected to the same in microcomputer B. FIG. 3 further shows the serial transfer means 211, 212, comprising the respective serial shift registers of microcomputers A and B, with their connection details.

Each shift register has a given number of storage bits(e.g., 8 bits in case of FIG. 3), and, although not explicitly shown, is connected to an accumulator through internal bus lines within the respective microcomputer. Data can be set from the accumulator to the shift register for transfer; and can be transferred from the shift register to the accumulator. The shift registers operate in synchronism with shift clock pulses CLK generated by microcomputer A.

Referring back to FIG. 2, data transfer or data exchange between the microcomputers is initiated by a signal READY from microcomputer B, which acts as a watchdog circuit for microcomputer A in accordance with a preferred embodiment of the present invention. (Although the present invention will be described hereinbelow with microcomputer B acting as a watchdog circuit for microcomputer A, it will be appreciated to those skilled in the art that their roles can be reversed readily without departing from the invention concept.) The signal READY is transferred to microcomputer A via an output port P1 of microcomputer B and an input port P1 of microcomputer A, as shown in FIG. 2. When microcomputer B is ready to send internal data and/or receive external data to/from microcomputer A, it sets the internal data/dummy data in its shift register and sends the signal READY to microcomputer A. When microcomputer A receives the signal READY, it supplies a predetermined number of shift clock pulses, corresponding to the number of storage bits in each shift register, to the shift registers to output the data stored in its shift register to the shift register of microcomputer B and, simultaneously, input the data stored in the shift register of microcomputer B into its own shift register. Consequently, after the predetermined number of shift clock pulses are generated, the contents of the shift registers of microcomputers A and B are exchanged. The received data are further discriminated in the respective microcomputers. In accordance with the preferred embodiment of the present invention, if the received data in the shift register of microcomputer A is a command for requesting watchdog data, a watchdog interrupt routine will be entered by microcomputer A, which will be described hereinbelow with reference to FIG. 4B.

Also depicted in FIG. 2 is an exemplary reset circuit 220 for resetting microcomputer A. In accordance with the preferred embodiment of the present invention, microcomputer B acts as a watchdog circuit for microcomputer A as well and when it detects an abnormality in microcomputer A, it asserts a "high" signal at an output port P2 to reset microcomputer A. As shown in FIG. 2, the reset circuit comprises a reset IC 221, a PNP transistor 222 and a NPN transistor 223 whose base terminals are commonly connected to the output port P2 of microcomputer B. The collectors of transistors 222, 223 are commonly connected to an input port $\overline{\text{RESET}}$ of microcomputer A, and the emitters of transistor 222, 223 are connected to the output port of the reset IC 221 and ground, respectively. As such, when microcomputer B asserts a "high" signal at the output port P2, the transistor 223 will be turned on, and, accordingly, a "low" signal will be applied to the input port $\overline{\text{RESET}}$ of microcomputer A, forcing microcomputer A to restart its program from the beginning thereof. On the other hand, when microcomputer B asserts a default "low" signal at the output port P2, the transistor 222 will be turned on, and, accordingly, a "high" signal will be applied from the reset IC 221 to the input port $\overline{\text{RESET}}$ of microcomputer A, not disturbing the on-going operation of microcomputer A.

Figure 4A:
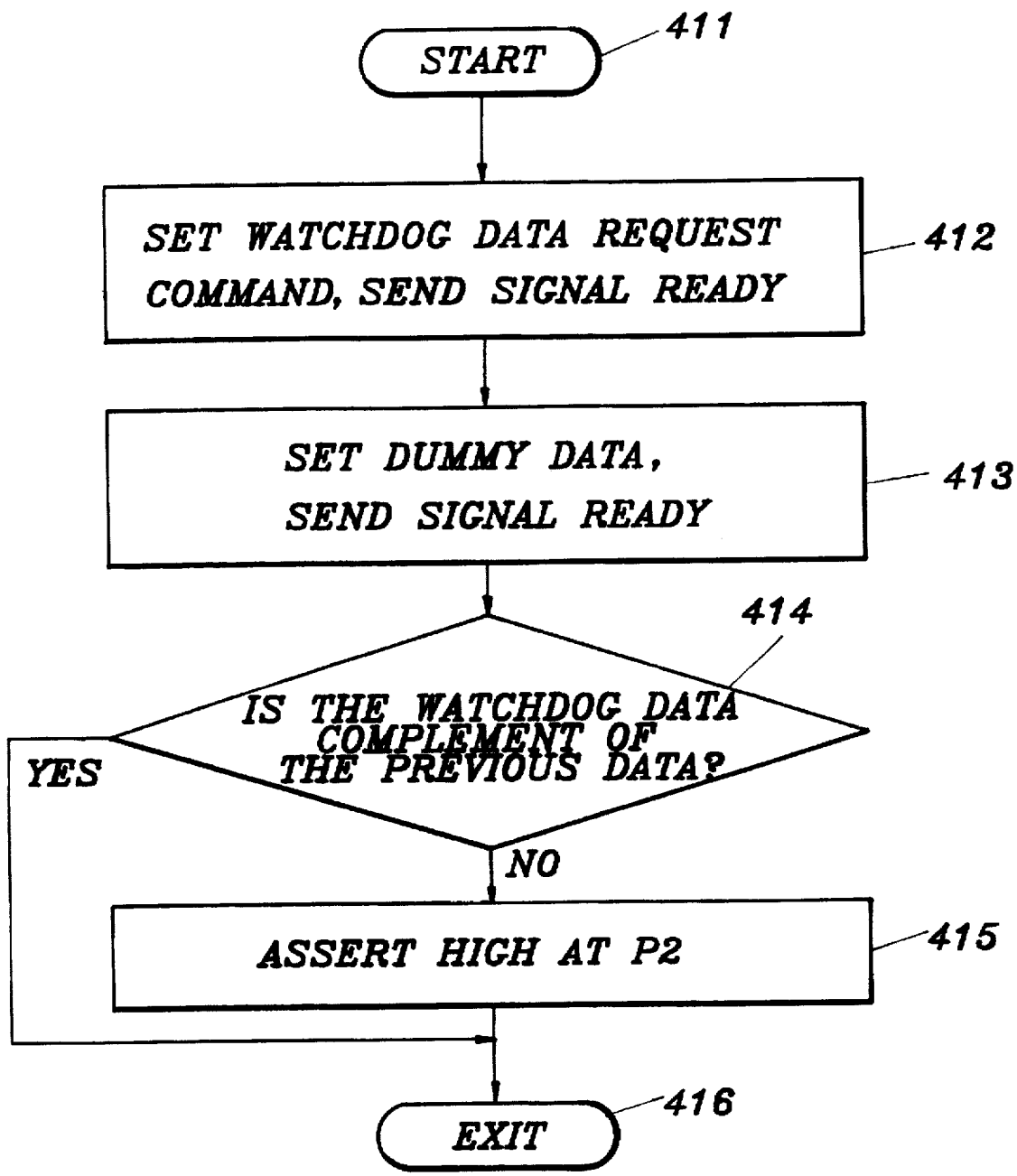
FIGS. 4A, 4B and 4C are a control flow chart illustrating the method of the present invention.
Figure 4B:
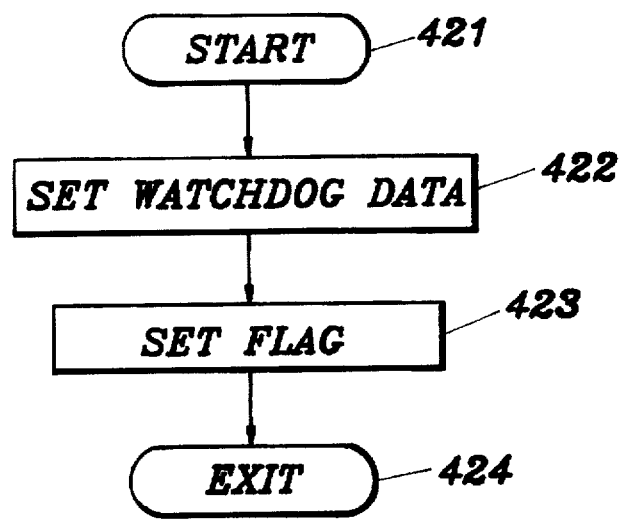
Figure 4C:
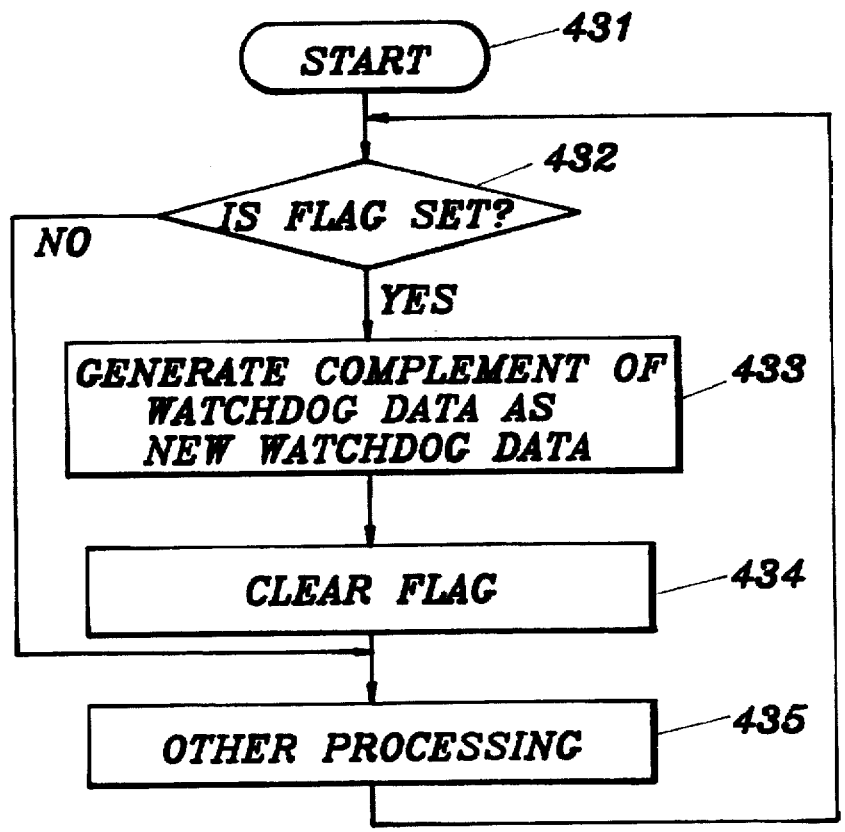

Hereinafter, the watchdog method of the present invention will be described with reference to FIGS. 4A, 4B and 4C. FIG. 4A describes the watchdog process performed by microcomputer B, while FIGS. 4B and 4C represent the watchdog interrupt routine and the main routine of microcomputer A, respectively. In accordance with the preferred embodiment of the present invention, microcomputer B enters and performs the watchdog process periodically. (The period must be set long enough to ensure that the main routine be executed by microcomputer A at least once within the period.) The watchdog process when entered by microcomputer B starts at block 411.

After the start, in block 412, microcomputer B sets in its shift register the watchdog data request command and then sends the signal READY to microcomputer A. Upon receiving the watchdog data request command, microcomputer A, if operating normally, enters the watchdog interrupt routine shown in FIG. 4B to set the watchdog data in its shift register. After an appropriate time delay for the setting of the watchdog data by microcomputer A, in block 413, microcomputer B sets dummy data in its shift register and then again sends the signal READY to microcomputer A to input the watchdog data into its shift register. Thereafter, in block 414, microcomputer B compares the presently received watchdog data with the previously received one.

As will be further described with reference to FIGS. 4B and 4C, microcomputer A, if operating normally, is made to generate, in response to each watchdog data request command, watchdog data to be the complement of the previously generated one. (In this connection, although not explicitly shown, it is necessary that microcomputer B assign, at an early stage of its operation steps not shown in FIG. 4A, a value, e.g., $(000)_2$, as the initial value of the previously received watchdog data, and microcomputer A generate, upon receiving a first watchdog data request command, the complement of the value, e.g., $(111)_2$, as the watchdog data.)

Accordingly, in accordance with the preferred embodiment of the present invention, microcomputer B can determine whether microcomputer A is in normal state by comparing the received watchdog data with the previously received one: that is, if, in block 414, the received watchdog data is the complement of the previously received one, it can be recognized that microcomputer A is in normal state. In this case, in block 416, microcomputer B exits the watchdog process until a next periodic entrance.

If, however, the received data is not the complement of the previously received one, recognizing that microcomputer A is in an errant state, microcomputer B proceeds to block 415 to assert a "high" signal at the output port P2 to thereby reset microcomputer A via the reset circuit 220. Thereafter, in block 416, microcomputer B exits the watchdog process.

Turning now to FIG. 4B, there is shown the watchdog interrupt routine which will be entered by microcomputer A in response to each watchdog data request command from microcomputer B. As shown in FIG. 4B, the interrupt routine starts at block 421, and in block 422 microcomputer A sets in its shift register watchdog data to be transferred to microcomputer B, and then, in block 423, sets a flag. Thereafter, in block 424, microcomputer A returns to its main routine.

Referring now to FIG. 4C, there is shown the main routine which is performed by microcomputer A. As shown in FIG. 4C, the main routine starts at block 431, and in block 432 microcomputer A determines whether the flag has been set. If the flag is not set, recognizing that the previously generated watchdog data has not been transmitted to microcomputer B, microcomputer A bypasses next two steps, i.e., blocks 433 and 434. If, however, the flag is set, recognizing that the previously generated watchdog data has been transmitted to microcomputer B, microcomputer A generates, in block 433, new watchdog data to be the complement of the previously generated one.

Subsequently, in block 434, microcomputer A clears the flag to indicate that the watchdog data presently generated has not yet been transmitted to microcomputer B; and, accordingly, the watchdog data must be kept as it is until the transmission thereof. Then, in block 435, microcomputer A performs ordinary processes for the control of other parts of the video cassette recorder containing microcomputers A and B, as is required by the user of the video cassette recorder. Thereafter, the main routine returns to block 432 for the repetition thereof.

Consequently, in accordance with the present invention, when microcomputer A operates normally, microcomputer B will receive watchdog data in such predetermined manner as described above. If, however, microcomputer A is in an errant state for, e.g., being trapped in an endless loop, etc., microcomputer B will receive improperly generated watchdog data, or will not receive watchdog data at all. When microcomputer B detects such an abnormality in microcomputer A, it will reset microcomputer A by asserting a "high" signal at the output port P2.

While the present invention has been shown and described with reference to the particular embodiments, it will be apparent to those skilled in the art that many changes and modifications may be made without departing from the spirit and scope of the invention as defined in the appended claims.

What is claimed is:

1. In a video cassette recorder having a timer micom and a servo/syscon micom, a watchdog method for, upon detecting an abnormality in the timer micom by the servo/syscon micom, automatically resetting the timer micom, comprising the steps of:

(a) sending from the servo/syscon micom a request command for watchdog data to the timer micom via a serial communication path formed between the timer micom and the servo/syscon micom;

(b) transmitting from the timer micom the watchdog data to the servo/syscon micom in response to the request command for the watchdog data via the serial communication path;

(c) determining in the servo/syscon micom whether the watchdog data is normal;

(d) resetting the timer micom when the watchdog data is abnormal as determined in said step (c); and (e) repeating said steps (a) to (d) periodically.

2. The method as recited in claim 1, further comprising, after said step (a), the step of:

(a1) generating in the timer micom the watchdog data in a predetermined manner.

3. The method as recited in claim 2, wherein said step (a1) generates the watchdog data to be the complement of the previously generated watchdog data.

* * * * *